(12) United States Patent
Fleming (10) Patent No.: US 8,312,201 B2
(45) Date of Patent: Nov. 13, 2012

(54) MANAGING MEMORY ALLOCATIONS LOANS

(75) Inventor: Matthew D. Fleming, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 12/135,494

(22) Filed: Jun. 9, 2008

(65) Prior Publication Data

US 2009/0307432 A1 Dec. 10, 2009

(51) Int. Cl.
*G06F 12/00* (2006.01)

(52) U.S. Cl. ...... 711/6; 711/135; 711/170; 711/E12.001

(58) Field of Classification Search .............. 711/6, 135, 711/170, E12.001
See application file for complete search history.

(56) References Cited

U.S. PATENT DOCUMENTS

| | | | |
|---|---|---|---|
| 5,715,420 A | 2/1998 | Kahle et al. | |
| 6,067,607 A | 5/2000 | Maegawa et al. | |
| 6,366,994 B1 | 4/2002 | Kalyur | |
| 6,412,015 B1 | 6/2002 | Navare et al. | |
| 6,530,077 B1 | 3/2003 | Marsh | |
| 6,658,522 B1 | 12/2003 | Martin et al. | |
| 6,785,278 B1 | 8/2004 | Calvignac et al. | |
| 7,000,051 B2 | 2/2006 | Armstrong et al. | |
| 7,203,905 B2 | 4/2007 | Brockway et al. | |
| 7,363,456 B2 | 4/2008 | Fleming et al. | |
| 7,370,160 B2 | 5/2008 | Neiger et al. | |
| 7,624,240 B1 | 11/2009 | Colbert et al. | |
| 7,702,843 B1 | 4/2010 | Chen et al. | |
| 7,747,838 B2 | 6/2010 | Hepkin et al. | |
| 7,971,027 B2 | 6/2011 | Fleming et al. | |
| 8,055,876 B2 | 11/2011 | Fleming et al. | |
| 2004/0230974 A1 | 11/2004 | Hamilton, II et al. | |
| 2005/0232192 A1 | 10/2005 | Rawson, III | |
| 2005/0235123 A1 | 10/2005 | Zimmer et al. | |
| 2005/0235124 A1 | 10/2005 | Pomaranski et al. | |
| 2005/0257020 A1* | 11/2005 | Kashyap et al. .............. | 711/170 |
| 2005/0268052 A1 | 12/2005 | Hepkin et al. | |
| 2006/0004977 A1 | 1/2006 | Jann et al. | |
| 2006/0288187 A1 | 12/2006 | Burugula et al. | |
| 2007/0005870 A1 | 1/2007 | Neiger et al. | |
| 2007/0106993 A1 | 5/2007 | Largman et al. | |
| 2007/0294501 A1* | 12/2007 | Wolf et al. .................... | 711/170 |
| 2008/0082696 A1 | 4/2008 | Bestler | |
| 2009/0307377 A1 | 12/2009 | Anderson et al. | |
| 2009/0307686 A1 | 12/2009 | Hepkin | |

OTHER PUBLICATIONS

USPTO U.S. Appl. No. 12/135,012.
USPTO U.S. Appl. No. 12/135,286.
USPTO U.S. Appl. No. 12/135,316.

* cited by examiner

*Primary Examiner* — Mardochee Chery
(74) *Attorney, Agent, or Firm* — Stephen R. Tkacs; Stephen J. Walder, Jr.; David A. Mims, Jr.

(57) ABSTRACT

A mechanism for operating a virtual memory is provided in an operating system. The mechanism detects the existence of a central memory loan pool, identifies a segment of memory that is loanable, and transmits an indicator that the segment is available for loaning to the memory loan pool. The operating system contributing memory can monitor its actual memory capacity and reclaim the loaned segment if the amount of memory available to the loaning operating system (OS) gets below a predetermined value.

20 Claims, 3 Drawing Sheets

MANAGING MEMORY ALLOCATIONS LOANS

BACKGROUND OF THE DISCLOSURE

The present disclosure relates generally to computers. More particularly, the present disclosure relates to operation and uses for virtual memory sharing.

Many large computer systems can simultaneously run multiple operating systems (OSs). One, issue with such an arrangement is effectively allocating system resources to the multiple OSs. Some computers that support multiple OSs fix resource allocations for each OS, where the allocations do not change over time. More complex computer systems can dynamically allocate resources based on the needs of each OS.

Virtualizing memory functions has become a topic of great interest. Virtualizing memory can be done many ways. One way is by "paging" memory or swapping memory, where underutilized information stored in high performance memory is flushed out or moved to a remote location such as onto a disk. The term paging is often utilized because it is a flushing technique where the virtual address space is divided into fixed-sized blocks called pages and pages are flushed. A "page" is generally a contiguous block of memory of a certain size where a system manages units or blocks of memory the size of a page. Traditionally, pages in a system have uniform size or segment, for example 4096 bytes; A page is generally the smallest segment or unit of translation available to an OS. Accordingly, a page is a definition for a standardized segment of data that can be moved and processed by the system.

As part of virtualizing memory, traditional OSs perform memory pinning or pinning of memory pages. Pinning of pages or reserving of memory pages is typically a privileged capability and pinning is typically not available to normal processes but only to hypervisors and kernel extensions of the OS. A kernel extension can be a part of an OS that coordinates sharing of resources, where a kernel can "take" resources from the OS.

It can be appreciated that to make multiple OSs on the same platform operate efficiently, proper memory management can be a concern. On a computing platform that runs multiple OSs and/or processes, a majority of OSs and/or processors may stay idle, only utilizing a small percentage of their resources, while a few OSs or processors run at or over capacity. An OS that is overcommitted or running over capacity can be slowed by the lack of resources and can even fail. It can be appreciated that memory allocation is an important feature and lack of memory resources can significantly affect a platform and an OS.

For example, when an OS runs out of real or high performance memory assets, (random access memory), the OS will often resort to slow, inefficient memory sources. If the memory required by the OS or application exceeds what is allocated (for example, due to unpredicted high peak demand or memory leaks), the system can "crash" as the OS runs out of memory.

To avoid memory shortcomings, some computing platforms provide virtual memory to OSs. Generally, a virtual memory can be memory that is allocated which may not have a "physical" basis at any time, but can be mimicked as physical memory in conceptual terms. Alternately described, virtual memory can be a subsystem which is simulated by the computing platform. Thus, virtual memory can describe an amount of memory that is larger the actual memory. However, a properly operated virtual memory system can provide more cost effective storage than a memory system with fixed memory allocations.

Marty virtual memory systems are controlled by a hypervisor or a virtual memory manager (VMM). A hypervisor is often referred to as a virtual machine monitor/controller, where a hypervisor can manage a system such that multiple OSs can share resources according to a set of rules. Typical virtual memory designs overcommit memory. Failures due to overcommitment occur when multiple OSs individually request an amount of memory, and the combined request for memory exceeds the amount of memory available.

OSs that run in a virtualized memory environment may not be aware of memory virtualization. Some traditional systems provide memory virtualization by using an "off-the-shelf" operating system and adding a cooperative memory overcommitment (CMO) kernel extension to the OS. This extension can assist a hypervisor in managing the virtualized OS's memory resources. By limiting the amount of memory that can be pinned, the system is left with a large enough pageable pool to manage future allocations.

Global collaboration is becoming increasingly important in today's society. More and more applications are being designed to allow application data to be shared by multiple users across the globe or within the given network. Currently, methods exist that allow for this data sharing but: with drawbacks. For instance, consider two users needing to modify a common file. This file can be shared on a network by both users, but with a price. Users currently have to setup a network file system (NFS) to host the file, then in order to access the data, information will have to be transmitted across the network. If security is an issue; a secure system must be provided. In order to share one file, users must now utilize multiple technologies in order to get access to the file.

Many existing distributed computing solutions implement a master-slave architecture where there exists a master node which sends workloads to the slave nodes. The master node can collect the results from each slave node as a given task is completed. In order for this communication to take place, the master node must serialize the data objects or pass the data in a primitive form to be parsed/deserialized by the slave nodes. This process is time consuming since if requires significant overhead to parse the data.

BRIEF SUMMARY OF THE DISCLOSURE

In one embodiment, a method of operating a virtual memory is disclosed. The method can include an entity such as an operating system detecting the existence of a memory loan pool manager, determining a segment of memory that is loanable by the OS and transmitting an indicator that the segment is available in the loan pool. The contributing OS can monitor its memory capacity and request reclamation of allocated memory if the capacity of the retained memory gets below a predetermined value.

In another embodiment, a computing platform or enterprise system with a virtual memory system is disclosed. The platform can be configured to support a plurality of OSs. The OSs can indicate a segment of loanable memory to a memory pool. The platform can include a cooperative memory module configured to accept requests from an OS and based on the indicator, allocate loanable memory segments to requesting entities such as a hypervisor, a kernel or an OS. The platform can include a memory loaner pool module to store the indicator and other parameters related to available memory and to memory requests.

In yet another embodiment, an OS for use with a virtual memory is disclosed. The OS can include a virtual memory detector module to detect the existence of virtual memory, where the OS has segments in the virtual memory that are underutilized and allocatable or loanable. The OS can also include a loanable segment detector to detect the excess or loanable memory segments, and a communication module to communicate at least an indication of the detected loanable segments to a centralized virtual memory controller. In addition, the OS can include a reclaiming module to reclaim loaned allocations. The system can include a flushing module to flush segments of memory to make room for memory requests. The flushing system can flush segments in response to the priority of the information stored in the memory segment.

BRIEF DESCRIPTION OF THE SEVERAL VIEWS OF THE DRAWING

Aspects of the disclosure will become apparent upon reading the following detailed description and upon reference to the accompanying drawings where like references may indicate similar elements.

DETAILED DESCRIPTION OF EMBODIMENTS OF THE DISCLOSURE

The following is a detailed description of novel embodiments depicted in the accompanying drawings. The embodiments are in such detail as to clearly communicate the subject matter. However, the amount of detail offered is not intended to limit anticipated variations of the described embodiments; but on the contrary, the claims and detailed description are to cover all modifications, equivalents, and alternatives falling within the spirit and scope Of the present teachings as defined by the appended claims. The detailed descriptions below are designed to make such embodiments understandable to a person having ordinary skill in the art. While specific embodiments will be described below with reference to adapters, components, circuits or logic configurations, those of skill in the art will realize that embodiments of the present disclosure may advantageously be implemented with other components and configurations.

There has been a recent increase in the demand for virtualization of computing platforms. This has occurred because businesses such as those that run datacenters that support Internet processes, and those that service businesses cannot keep up with the processing demands of new clients and new applications. Virtualization of a server is much more efficient than adding new computing platforms, or in some cases servers. It can be appreciated that datacenters are typically over-stretched in terms of server count, floor space, electricity consumed and heat generated per square foot of raised floor space.

Virtualization of a system reduces server count by increasing the utilization efficiency of computing platforms and lowering the operating cost of such platforms. Virtualization is also an excellent solution to the problem of overwhelming demand for processing resources. Virtualization technologies can include the functions of a hypervisor, hardware partitioning, logical partitioning, and in accordance with the arrangements herein, virtualized memory management.

Generally, virtualization enables the sharing of the computing platforms physical resources. Virtualization is a multifaceted process that can be implemented through a combination of hardware, firmware, and software arrangements. In its simplest form, a virtualization engine is a layered architecture composed of a firmware module. A virtualizer can "sit" on top of physical hardware resources and control physical hardware to provide administration and resource management of the hardware. Thus, virtualization can control many functions such as partitioning OS access to resources.

When multiple OSs are operating on a computing platform, there can be a host OS and a plurality of guest OSs. Each OS can have a kernel or kernel extension that can coordinate the sharing of resources. Each guest OS's kernel and its drivers typically need to be modified to operate with other OSs. For example, a desktop running both a virtualized Windows XP® and a virtualized Max OSX® operating system will typically have one kernel extension for each operating system instance where the kernels must be configured for the particular application. In addition, a typical memory management kernel extension requires memory or takes memory from each operating system. The kernel memory allocations from the OSs pool can be allocated and reallocated as each virtualized operating system's needs change.

The description herein refers to memory segments, however, the arrangements disclosed could operate on any metric such as blocks, pages etc. The exact size of memory segments that are managed by a computing platform is typically determined by the system and what granularity the hardware can translate from an effective to a physical address.

A method of operating a virtual memory is disclosed. The method can include detecting the existence of a central memory loan pool manager, determining a segment of memory that is loanable by an entity, such as a page or a block, and transmitting an indicator that the segment is loanable to a pool of memory. The contributing OS can monitor its memory capacity and request reclamation up to an amount of previously allocated, memory if the OSs useable memory gets below a predetermined value. A hypervisor Can help the OS reclaim its allocated logical memory.

Since the OS can detect that it is operating in a virtualized environment, and the OS knows at any given time it can reclaim its allocation, the OS can provide segments for loan without traditional pinning methods. When the OS wants part of its logical allocation back, the hypervisor will give up memory allocations to the reclaiming OS and the hypervisor will find a new or different source for memory. Thus, the loaned pages do not need to be treated as pinned, nor do the loaned pages need to be treated as though they were removed from the loaning OSs virtual address space, as with traditional systems. Accordingly, the disclosed arrangements effectively eliminate the traditional step of either pinning memory, or acting as though the available memory for pinning has been reduced.

In some embodiments, to be legacy compliant if an OS detects that it is operating on a loan pool type virtual memory system, the OS can change its mode of memory sharing and offer loaner pages to a centralized loan pool without any outside input. When there is no virtual memory system detected, and in accordance with legacy systems, the OS can pin memory pages and place pinned pages on an internal or local free-list. Pages on the free-list can be unused memory pages allocated to ah OS that the OS will make available to OSs when requested.

Figure 1:
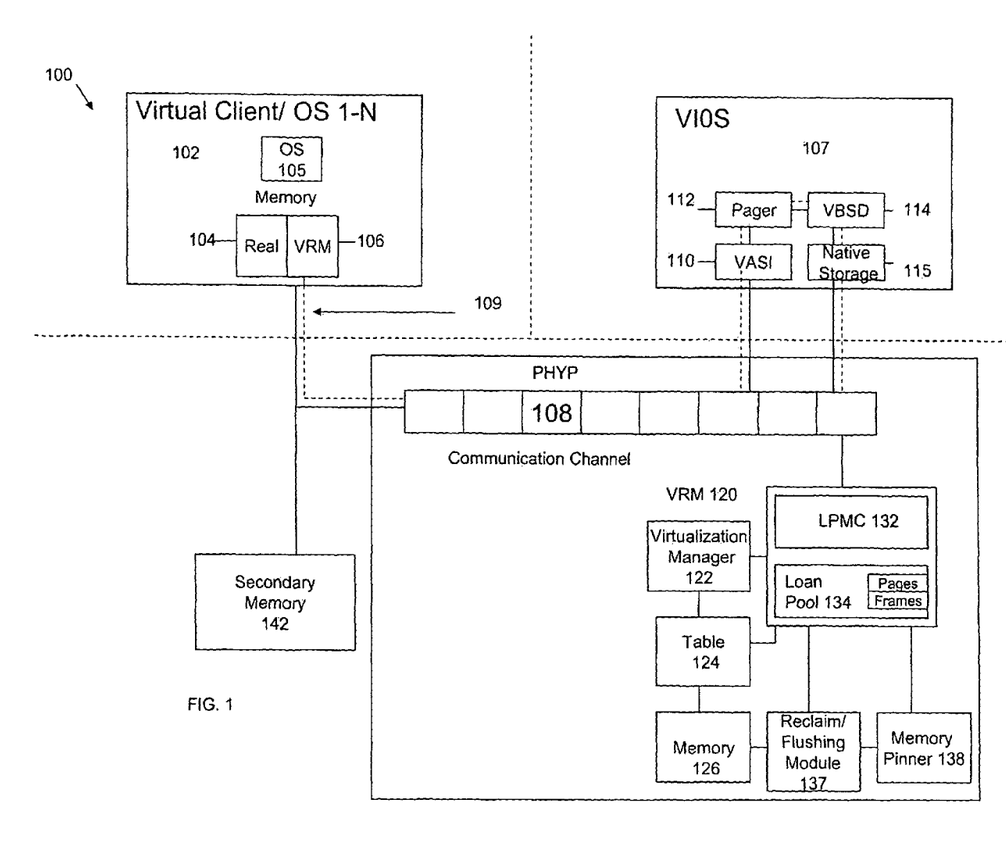
FIG. 1 is a block diagram of part of a computing platform with a virtual real memory.

Referring to FIG. 1, a diagram illustrating a computing system or platform 100 with a virtual real memory (VRM) is disclosed. The platform 100 can include a virtual client 102 with an operating system (OS) 105, real memory 104 and a virtual real memory interface 106. The virtual client 102 can be viewed as strictly an OS where the OS can run various applications. Although only one virtual client 102 and OS is illustrated, the platform 100 will typically have a plurality of OSs. Only one OS is shown to simplify the description.

Although the PHYP 108 is drawn as a single entity the PHYP 108 is ubiquitous and can be part of the VRM 120. Although, not specifically drawn on FIG. 1 all communications between hardware devices can utilize and "go through" PHYP 108. PHYP 108 can be stored in and can control VRM 102 and PHYP 108 can be considered as part of the VRM 120. In some embodiments, all communications between hardware entities can be controlled by PHYP 108 and can utilize a command request queue. PHYP 108 can be considered as a low level operating system that controls all other operating systems.

During start-up and possibly periodically during operation each OS, such as OS 105, can detect the presence of a virtualization manager 122 or a VRM 120. After such detection, the OS 105 can scan its real memory 104 and its memory allocation, possibly stored in VRM 106. Based on the amount of unused memory allocated by the VRM 120, the OS 105 can send an indication of this unused memory allocation to the LPMC 132. Such an indication might identify specific pages or groups of pages.

The platform 100 can also include a virtual input-output server or system (VIOS) 107 where the virtual client 102 can be connected to the VIOS 107 via a power hypervisor (PHYP) 108. The VIOS 107 can include a virtual asynchronous services interface (VASI) 110, a pager 112, a virtual block storage driver (VBSD) 114 and a native storage device driver 115. The VIOS 107 can enable bridging of physical input-output devices to virtual input-output devices, as illustrated, The dashed line 109 connecting the virtual real memory VRM 120, the VIOS 107, the communication channel 108 and the virtual client 102 represents a path of the input-output of the VRM 107.

The VIOS 107 can accept a packet transmission from the virtual client 102 via the VASI 110. The VASI 110 can be utilized by mover services such as the VIOS 107 to communicate with the PHYP 108. The pager 112 can segment incoming data into pages and can perform paging or moving data in block increments. The pager 112 can have a buffer page that accepts data serially and when the buffer page is full, the pager 112 can transmit the page of information to the VBSD 114. The VBSD 114 can forward the page of data to the native storage module 115 and the native storage module 115 can communicate with the VRM 120.

The VRM 120 can include a loan pool memory controller (LPMC) 132, a memory loan pool 134 that indexes pages, blocks or frames, a virtualization manager 122, memory module 126, reclaim/flushing module 137 and memory pinner 138. The VRM 120 can access the secondary memory 142 when additional memory is needed. The secondary memory 142 can be a hard disk of some form of additional, typically lower performance, memory. The secondary memory 142 can be a block type memory that operates in blocks of data. The memory module 126 can have a committed section of memory or a logical memory allocation that provides memory resources to the virtual client 102 during virtual client operation. The amount of allocated memory can be much greater than the in use and useable memory depending on how much memory has been loaned and how much memory is reserved. Thus, the useable memory (used plus not loaned) in the memory module 126 can be dynamic and change over time based on borrowing from the PHYP 108 and other entities.

The LPMC 132 can allow a virtualized OS, such as OS 105, to operate as if more memory is available to the OS 105 than actually exists in the VRM 120. Thus, the LPMC 132 can allocate and control memory functions such that the VRM 120 can be overcommitted, yet effectively support OS 105 and other OSs. The LPMC 132 and the VRM 120 can create the memory virtualization.

The PHYP 108 can manage memory overcommitment of physical memory by moving segments to and from secondary storage 142 when an overflow condition occurs. However, it is more efficient, when possible, for the virtualized OS 105 to reserve some of its allocated virtual memory (allocated virtual addresses) and loan only a portion of its allocation to the PHYP 108 for use by other virtualized OSs.

Memory segments can be loaned by the OS 105 responsive to the OS 105 detecting virtualization. Rather than pinning memory, which can be reserved for the PHYP 108, the OS 105 can limit the amount of memory that it loans to a PHYP 108 and reserve a buffering amount of its memory allocation for surges; in memory usage. In other embodiments, no buffer is heeded as the OS can loan out all pages that it is not currently utilizing. In traditional systems, an external CMO extension is typically limited to an amount of OS memory that the extension can pin, because the OS should maintain a sufficiently large pageable pool in memory 126.

The disclosed OS 105 does not need to carefully consider the size of the pageable pool in memory 126 when loaning segments or pages because the PHYP 108 can page virtual memory to secondary storage when an overcommitment occurs. Virtual segments which are loaned from an OS 105 can still belong to the virtualized OS 105 and the OS 105 can loan out all unused pages because the OS can reclaim the loaned segments whenever needed.

When overcommitment occurs, memory management can be turned over to the PHYP 108 and the PHYP 108 can carry the burden of managing solutions to the memory overcommitment. Generally, during an OS reclamation, physical pages that are backing the virtual pages needed by the OS can be reassigned, by the PHYP 108 from secondary memory 142 to high performance memory 126 and the logical to physical location tables can be updated. If the loaning OS 105 finds at some point that it cannot afford to continue the loan of one or more pages, the OS 105 can just start using the loaned virtual pages, and the PHYP 108 can detect this and manage the memory reallocations.

Using a memory overcommitment extension, the OS 105 can allocate and pin some memory allocated to the OS 105. This pinned memory can be "owned" by the overcommitment extension and can be loaned back to the PHYP 108. The PHYP 108 can then assign physical pages to back the virtual memory for another OS as the PHYP 108 can determine that the loaned memory is not actually in use by the virtualized OS.

In accordance with some embodiments, the OS 105 can allocate a specific amount of unused or underutilized memory or specific locations of such a memory resource in memory module 126 to the loan pool 134. The memory resource of memory module 126 can be provided or loaned by the OS 105 without a request from another entity such as an underserved OS. Thus, the OS 105 can voluntarily post its loanable memory page locations to the loan pool 134. Traditional OSs pin the majority of their pageable memory waiting for a request from a needy OS. In some embodiments, when the OS 105 detects that it does hot have enough available memory, the OS 105 can query the LPMC 132 and try to reclaim some of the memory that the OS 105 previously allocated to the loaner pool 134.

The virtualized memory system can have one or more page table(s) 124 that can be utilized by the hardware to translate an effective address or virtual address to a real address. The OS 105 can manage the table 124 to reflect how the OS 105 has allocated memory. The table 124 can including a tracking function for "in use" portions of memory. Such tracking can include tracking of memory locations that are being used by the kernel, locations that are being utilized by applications, either running or idle, memory locations for open files, etc.

Each memory segment can be mapped by the table 124 onto any physical address available on the system. This mapping process allows data to occupy less physical memory or local memory than is allocated as logical address space. The memory module 126 can be divided into pages and unused or infrequently used memory pages can be paged out to a swap area oh a secondary storage source 142, such as a hard disk, and can be paged back in when needed. Such a swapping process allows a program or application operating on the OS 105 to use more memory than is actually "available" as determined by the application.

As stated briefly above, in some embodiments, when pages are loaned or taken by the PHYP 108, the virtualization manager 122 or the PHYP 108 can monitor which loaned pages displace a physical page and create a logical page and record memory transaction in a table. The physical pages can be placed in secondary memory 142 and the physical page can back the logical page in the table. Accordingly, when the OS 105 notifies the virtualization manager 122 or the PHYP 108 that the OS 105 is loaning a page, typically no action such as flushing is taken.

When segments allocated to the OSs are physically moved out of memory 126 the logical page and the OS logical allocation can remain the same, however the physical page can be utilized by another entity because it is "on loan." The virtualization manager 122 or the PHYP 108 can take or control the physical page and use it to back a different logical page allocated to the loaning entity. Such an implementation can be performed for a different partition or OS instance. In some embodiments, each OS 105 can be serviced by a virtualization manager 122. In other embodiments, a single virtualization manager 122 can service more than one or all OSs. Thus, during times when OS 105 and other OSs are not running near capacity, the loan pool 134 can provide the LPMC 132 with large amount of loanable memory, possibly for other computing resources.

In some embodiments, the OS 105 can loan memory segments on a page by page basis or the OS 105 can loan pageable memory to the loan pool 134 until the OS 105 determines that the OS 105 does not have enough pageable memory left in memory 126. Sending loanable memory to the loan pool 134 is a proactive approach to memory allocation. This can be distinguished from traditional systems that are reactive, where an accounting for available memory and a search for available memory occurs when an OS determines that memory resources are needed and large margins or memory reserves are needed such that request is not "too little too late" as the system crashes.

In some embodiments, the VRM 120 provides a centralized memory "loaner pool" with a significant amount of memory. It can be appreciated that generally, the more OSs on the platform with properly allocated virtual memory, the larger the loaner pool, and the better the memory utilization of the VRM 120 becomes. The OS 105 could be a host OS of a non-host OS. It can be appreciated that an idle OS 105 can loan a significant amount of its memory allocation to the loan pool 134. It can also be appreciated that at low platform activity levels, a significant amount of memory can be available in the loan pool 134. In addition, the VRM 120 allows much more memory to be loaned among OSs than allowed by traditional systems or native algorithms.

It can be appreciated that the disclosed VRM 120 performs virtualization in a distinctly different manner from memory virtualization provided by a traditional OS for an application. For example a traditional OS that virtualizes memory assigns importance levels to different pages in memory and treats: pages with different importance levels differently and flushes pages with low importance levels when memory is full. The VRM 120 or the virtualization manager 122 does not operate according to the importance of a page. Since the VRM 120 is a centralized memory system the VRM 120 would have difficulty determining importance levels for pages that are from different OSs and from different kernels.

Some systems fix or permanently allocate or pin some amount of memory, sometimes memory allocated for an OS, for kernels. This permanent, allocation of memory for kernels can eliminate portions of memory from the loan pool 134 such that dynamic allocation cannot be achieved. In some embodiments, the VRM 120 does not specifically allocate for kernels.

Figure 2:
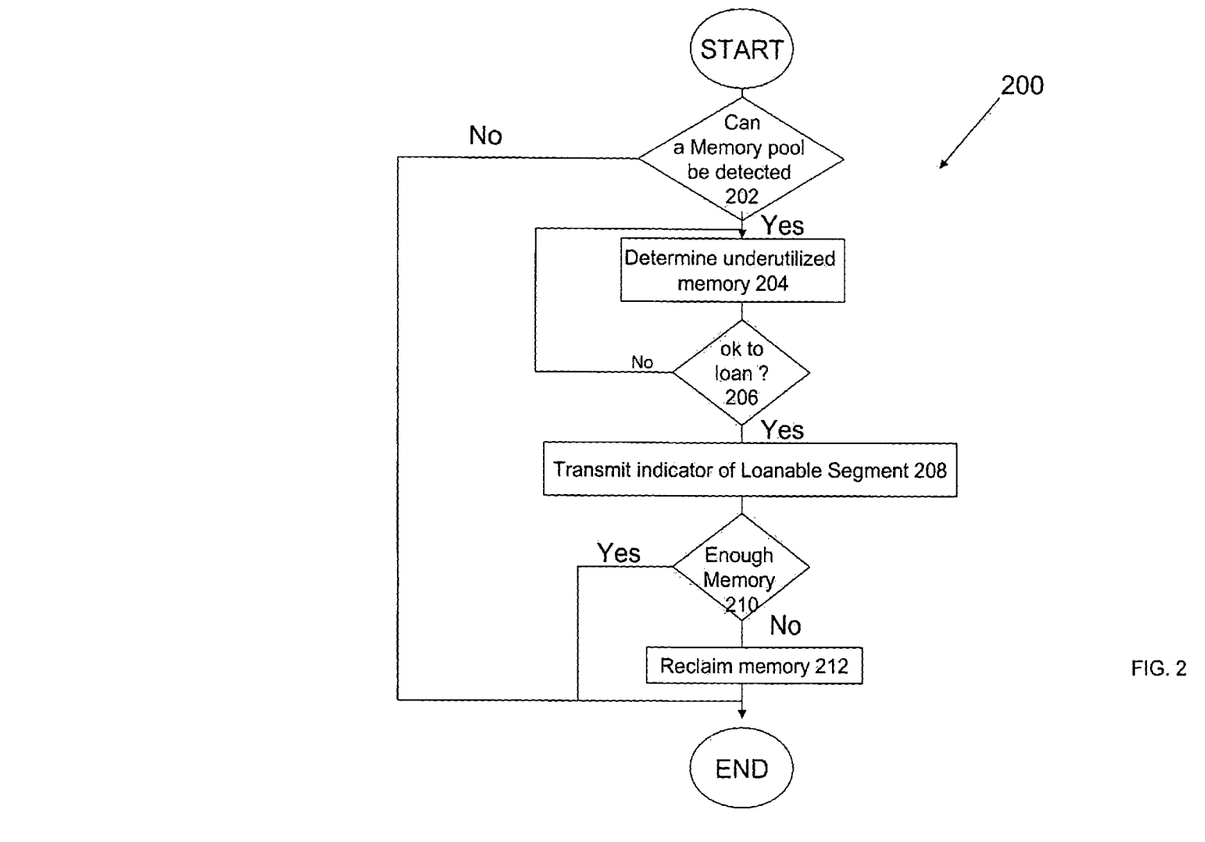
FIG. 2 is a flow diagram of a method for operating a virtual real memory.

Referring to FIG. 2, a flow diagram 200 illustrating a method for managing a memory system is disclosed. As illustrated by decision block 202, a processing entity, such as an OS, can determine if a centralized memory loaner pool or a centralized virtual memory system is available. If a centralized virtual memory system is not available, the process can end. If, as illustrated by decision block 202, a centralized memory loaner pool can be detected, then an amount of unused or underutilized memory can be determined, as illustrated by block 204.

As illustrated by decision block 206, it can be determined if underutilized memory can be loaned. If the memory cannot be loaned, the process can return to block 204 and continue to monitor unused or underutilized memory. If there is capacity to loan memory segments, then the OS can transmit an indicator representing such a condition to a loaner pool, as illustrated by block 208. In some embodiments, the indicator can be a list of loanable segments to be posted by the loaner pool such that they can be scanned by a requesting resource.

As illustrated by decision block 210, the OS can monitor memory resources and again determine if there is enough memory available to allow the OS to operate effectively. If the OS determines that there is not enough memory available, the OS can reclaim memory segments in its logical allocation, as illustrated by block 212. After reclamation and if the OS has enough memory the process can end.

The OS generally cannot run out of pinned pages because even though the OS has loaned pages it still has its virtual allocation (that is on loan) available. Thus, the hypervisor can page but OS pinned memory as heeded. So the OS does not need to treat loaned pages like pinned pages as in the case of a traditional cooperative memory overcommitment (CMO) kernel. It can be appreciated that when a CMO is loaning the pages as an external module (the CMO) and such loaning occurs without OS knowledge and since the OS is aware of the CMO can cause inefficiencies.

Specifically, when reserving pages to be loaned, they do not need to be considered as pinned pages, nor do the regular OS pin limits need to be recomputed to reflect that some pages are loaned. This is because the loaned pages still virtually belong to the OS. It can be appreciated that the implementation of an external CMO kernel to control memory is not as efficient as having ah OS with an integrated CMO module, where the OS knows that is has virtualized memory. Generally, an external CMO module does not consider OS memory management and thus the OS can make better choices about loaning memory to the hypervisor.

Figure 3:
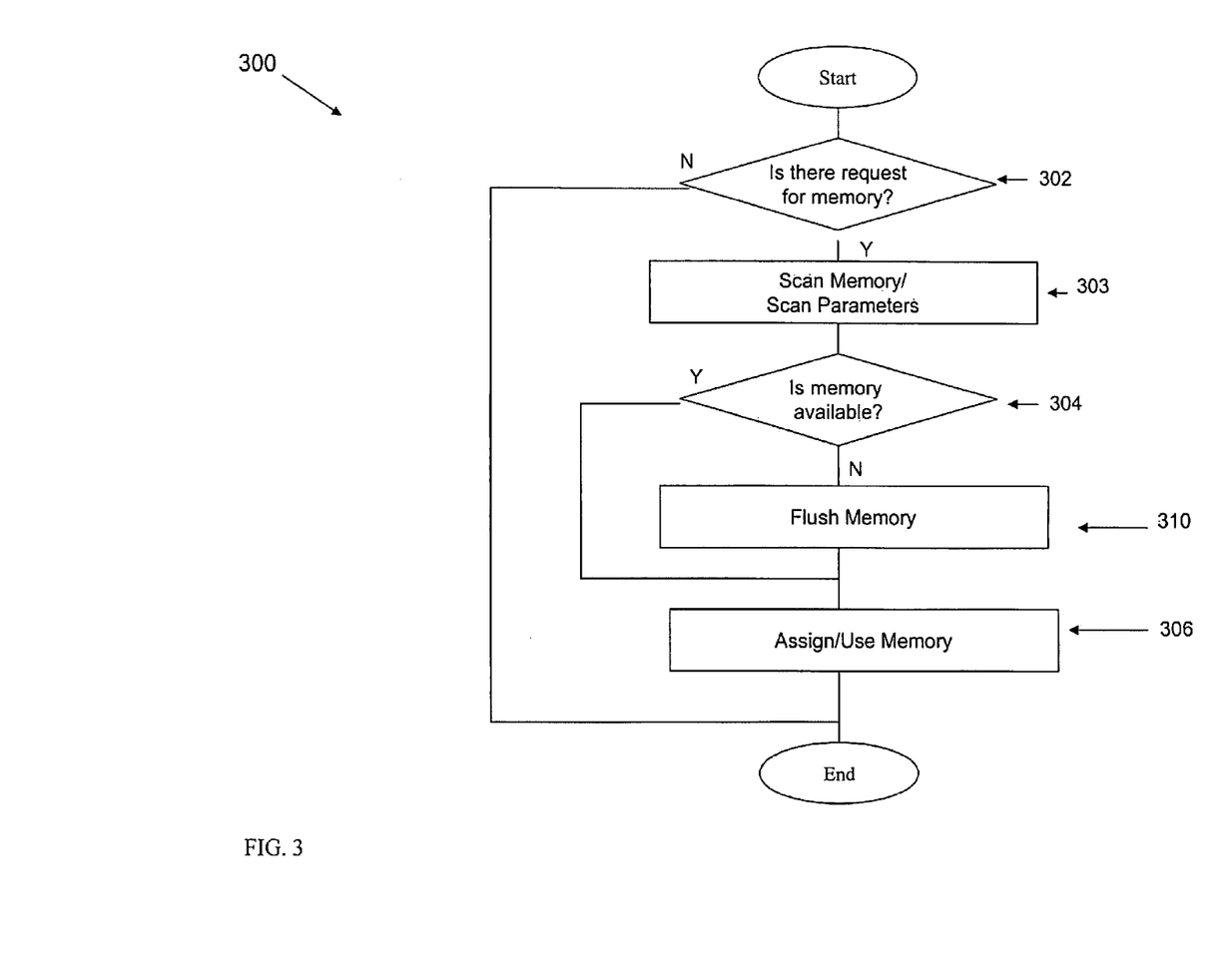
FIG. 3 is a flow diagram of a method for operating an OS with virtual memory.

Referring to FIG. 3, a flow diagram 300 for a method that provides memory allocation for a virtual memory system is disclosed. The memory allocation arrangements disclosed can be centralized into large, possibly several terabytes. Such a virtual memory arrangement can operate as part of an enterprise type computing platform. The disclosed centralized virtual memory arrangements can achieve greater utilization rates and operate more efficiently than distributed virtual memory systems.

As illustrated by decision bock 302, it can be determined if a processing module, or an entity such as an OS, is in search of memory and how much memory the entity is requesting. The description herein utilizes an OS as a requesting entity for simplification purposes, however an OS is only a possible type of entity or processing system that could utilize the disclosed virtual memory system. If at decision block 302 an entity is not searching for memory, the process can end.

If at block 302 an entity is searching for memory, a memory manager can be utilized to scan a loaner pool, indicators or parameters of a loan pool, as illustrated by block 303. As illustrated by decision block 304, it can be determined if the loan pool has an adequate amount of memory to fulfill the request.

The request for memory by OSs can be accepted by a virtualization manager of memory manager of a virtual memory system. The memory manager of the virtualized memory system can provide a central query location for OSs to request memory allocations. The manager can receive and store indicators from donors and trace parameters of the memory, such as how many pages are available and the locations of the available pages or blocks. In some embodiments, the disclosed centralized loaner pool can be queried by, or scanned by, an OS for loanable page capacity. Thus, a requesting OS can determine if the pageable pool has enough memory to accommodate the request prior to any allocation of loanable memory to the requesting OS.

As illustrated by decision block 304, if loanable memory is available it can be assigned to and utilized by the requesting OS, as illustrated in block 306. The process can end thereafter. If there is not enough memory available to fulfill the request the OS can reclaim its allocation. The physical pages reclaimed by the OS can be taken from a hypervisor and the hypervisor can flush the physical location, as illustrated in block 310. Flushing can be a process such as a page replacement process. In some embodiments, the memory locations can be flushed based on parameters in the request or based on memory system rules and parameters.

One parameter that could be utilized to control flushing could be an amount of memory requested by the OS, and another parameter could be to reclaim memory segments that were previously allocated to the requesting OS, and loaned by the requesting OS. When an OS has placed an allocation in the loan pool and retrieves at least part of the allocation back, this can be referred to as reclaiming. Yet, another control signal could request flushing based on usage, page classifications, ratings or a priority. The process can end thereafter.

Such controlled flushing can provide various levels of efficiency. In some embodiments, if the OS has loaned pages and these pages are no longer available in the pool because they have been allocated to other OSs, instead of reclaiming the loaned segment, the OS may be able to locate loaner memory blocks from other OSs that have a lower priority level, thus creating less disruption. In some embodiments, when the OS has a low duty cycle the OS can loan out a majority of its allocated memory pages. In some embodiments, when an OS is idle, the OS may place 100% of its allocated memory in the loaner pool. Such a high percentage allocation by an OS cannot be achieved by traditional systems.

In some embodiments, if the OS does not have enough memory available to perform page replacement, the OS can flush pages to secondary memory. In some embodiments, when the OS reclaims some of its memory allocation, the host OS can start paging the reclaimed memory of can page the memory allocated to another OS. It can be appreciated that this reclaiming process is efficient because if a host OS is paging in accordance with the disclosed operation, generally, there is not enough physical memory for all the virtualized OSs and even a traditional system would have difficulties under such circumstances.

In some embodiments, pages in memory that are unused or underused can be tagged as candidate pages for flushing by; a utilization monitor in the memory manager. When certain conditions are met, the candidate pages can be flushed to a disk or moved to a secondary storage means. Search criteria provided by the searching OS can dictate a number of pages that need to be flushed by the memory manager. In some embodiments, the candidate pages can even be pinned pages. The method can facilitate loaning pages from a host OS to a non-host OS and from a non-host OS to a host OS.

Embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer of any instruction execution system. For the purposes of this description, a computer-usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage; and cache memories which provide temporary storage of at least some program code in order to reduce the number of times code must be retrieved from bulk storage during execution.

Input/output, or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

The invention claimed is:

1. A method of operating memory comprising:
   detecting, by an operating system having an allocated memory that is allocated to the operating system from a virtual real memory, that the allocated memory is underutilized;
   responsive to detecting that the allocated memory is underutilized, identifying, by the operating system, a segment of the allocated memory to be loaned to a loan pool;
   transmitting, by the operating system, an indicator of the segment of the allocated memory to a loan pool controller that manages the loan pool such that the loan pool controller adds the segment of the allocated memory to the loan pool;
   monitoring, by the operating system, memory capacity; and
   responsive to the memory capacity being below a predetermined value, reclaiming, by the operating system, the segment of the allocated memory from the loan pool.

2. The method of claim 1, wherein the operating system limits the amount of the allocated memory that it loans to the loan pool and reserves a buffering amount of the allocated memory for surges in memory usage.

3. The method of claim 1, wherein the loan pool controller loans the segment of the allocated memory to a second operating system.

4. The method of claim 1, further comprising performing page replacement in response to the operating system transmitting the indicator of the segment of the allocated memory to the loan pool controller.

5. The method of claim 4, wherein the page replacement process comprises flushing memory contents.

6. The method of claim 5, wherein flushing memory contents comprises moving memory contents to a secondary memory source.

7. The method of claim 1, further comprising:
   moving the segment of memory from a physical segment of a memory module to a secondary memory; and
   loaning the physical segment of the memory module to a second operating system.

8. The method of claim 1, wherein the segment of allocated memory is a page of memory.

9. A data processing system comprising:
   at least one processor; and
   a memory coupled to the at least one processor, wherein the memory comprises instructions which, when executed by the at least one processor, cause the at least one processor to:
   detect, by an operating system having an allocated memory that is allocated to the operating system from a virtual real memory, that the allocated memory is underutilized;
   responsive to detecting that the allocated memory is underutilized, identify, by the operating system, a segment of the allocated memory to be loaned to a loan pool;
   transmit, by the operating system, an indicator of the segment of the allocated memory to a loan pool controller that manages the loan pool such that the loan pool controller adds the segment of the allocated memory to the loan pool;
   monitor, by the operating system, memory capacity; and
   responsive to the memory capacity being below a predetermined value, reclaim, by the operating system, the segment of the allocated memory from the loan pool.

10. The data processing system of claim 9, wherein the operating system limits the amount of the allocated memory that it loans to the loan pool and reserves a buffering amount of the allocated memory for surges in memory usage.

11. The data processing system of claim 9, wherein the loan pool controller loans the segment of the allocated memory to a second operating system.

12. The data processing system of claim 9, wherein the memory comprises instructions further cause the at least one processor to perform page replacement in response to the operating system transmitting the indicator of the segment of the allocated memory to the loan pool controller.

13. The data processing system of claim 9, wherein the memory comprises instructions further cause the at least one processor to:
   move the segment of memory from a physical segment of a memory module to a secondary memory; and
   loan the physical segment of the memory module to a second operating system.

14. The data processing system of claim 9, wherein the segment of allocated memory is a page of memory.

15. A computer program product comprising a computer readable memory having a computer readable program stored therein, wherein the computer readable program, when executed on a computing device, causes the computing device to:
   detect, by an operating system having an allocated memory that is allocated to the operating system from a virtual real memory, that the allocated memory is underutilized;
   responsive to detecting that the allocated memory is underutilized, identify, by the operating system, a segment of the allocated memory to be loaned to a loan pool;
   transmit, by the operating system, an indicator of the segment of the allocated memory to a loan pool controller that manages the loan pool such that the loan pool controller adds the segment of the allocated memory to the loan pool;
   monitor, by the operating system, memory capacity; and
   responsive to the memory capacity being below a predetermined value, reclaim, by the operating system, the segment of the allocated memory from the loan pool.

16. The computer program product of claim 15, wherein the operating system limits the amount of the allocated memory that it loans to the loan pool and reserves a buffering amount of the allocated memory for surges in memory usage.

17. The computer program product of claim 15, wherein the loan pool controller loans the segment of the allocated memory to a second operating system.

18. The computer program product of claim 15, wherein the computer readable program further causes the computing device to perform page replacement in response to the operating system transmitting the indicator of the segment of the allocated memory to the loan pool controller.

19. The computer program product of claim 15, wherein the computer readable program further causes the computing device to:

move the segment of memory from a physical segment of a memory module to a secondary memory; and loan the physical segment of the memory module to a second operating system.

20. The computer program product of claim 15, wherein the segment of allocated memory is a page of memory.

* * * * *